US012768710B2

(12) United States Patent
Lafort et al.

(10) Patent No.: US 12,768,710 B2
(45) Date of Patent: Oct. 20, 2026

(54) VIBRATION SENSOR WITH AIR VENTING CHANNELS

(71) Applicant: Sonion Nederland B.V., Hoofddorp (NL)

(72) Inventors: Adrianus Maria Lafort, Hoofddorp (NL); Benjamin Abraham Zeev Mimoun, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 245 days.

(21) Appl. No.: 18/570,943

(22) PCT Filed: Jun. 14, 2022

(86) PCT No.: PCT/EP2022/066186
§ 371 (c)(1),
(2) Date: Dec. 15, 2023

(87) PCT Pub. No.: WO2022/268574
PCT Pub. Date: Dec. 29, 2022

(65) Prior Publication Data
US 2024/0369402 A1 Nov. 7, 2024

(30) Foreign Application Priority Data
Jun. 21, 2021 (DK) ............................ PA202170315

(51) Int. Cl.
*G01H 11/06* (2006.01)
*H04R 25/00* (2006.01)

(52) U.S. Cl.
CPC ............ *G01H 11/06* (2013.01); *H04R 25/48* (2013.01); *H04R 2460/13* (2013.01)

(58) Field of Classification Search
CPC ............................................. H04R 2201/003
See application file for complete search history.

(56) References Cited

U.S. PATENT DOCUMENTS 4,574,327 A 3/1986 Wilner
5,350,189 A 9/1994 Tsuchitani et al.
(Continued)

FOREIGN PATENT DOCUMENTS

CN 211930871 U 11/2020
DE 102017205304 A1 10/2018
EP 3252444 A1 12/2017

OTHER PUBLICATIONS

European Office Action dated Feb. 19, 2025 issued in corresponding European Patent Appln. No. 22733110.5.
(Continued)

*Primary Examiner* — Alexander A Mercado
(74) *Attorney, Agent, or Firm* — Harness, Dickey & Pierce, P.L.C.

(57) ABSTRACT

The present invention relates to a vibration sensor comprising a carrier substrate comprising a first surface and a second surface, a suspension member and a moveable mass secured thereto, wherein the moveable mass and/or at least part of the suspension member is/are adapted to vibrate when the vibration sensor is exposed to external vibrations, a read-out arrangement for detecting vibrations of the moveable mass and/or at least part of the suspension member, and a signal processor for at least processing an electric signal from the read-out arrangement, wherein the read-out arrangement comprises a capacitor formed by a first capacitor electrode and a second capacitor electrode separated by an air gap, and wherein the first capacitor electrode and/or the second capacitor electrode comprises one or more air venting channels in order to reduce squeeze film damping effects between the first and second capacitor electrodes. The present invention further relates to a hearing device comprising such a vibration sensor and use of the vibration sensor for voice recognition in a hearing device.

16 Claims, 5 Drawing Sheets

(56) References Cited

U.S. PATENT DOCUMENTS

| | | | | |
|---|---|---|---|---|
| 5,456,111 | A | 10/1995 | Hulsing, II | |
| 8,634,924 | B1* | 1/2014 | Ko | H04R 25/606 607/136 |
| 11,350,208 | B2* | 5/2022 | Post | H04R 1/2807 |
| 12,495,260 | B2* | 12/2025 | Chen | H04R 7/18 |
| 2001/0042404 | A1 | 11/2001 | Yazdi et al. | |
| 2006/0233401 | A1* | 10/2006 | Wang | H04R 19/005 381/176 |
| 2007/0283763 | A1 | 12/2007 | Silverbrook et al. | |
| 2010/0001615 | A1 | 1/2010 | Steeneken et al. | |
| 2014/0133685 | A1* | 5/2014 | Liu | H04R 3/005 381/174 |
| 2014/0307909 | A1* | 10/2014 | Yang | H04R 19/04 381/369 |
| 2016/0117015 | A1 | 4/2016 | Veneri et al. | |
| 2017/0276698 | A1 | 9/2017 | Bulatowicz et al. | |
| 2019/0116427 | A1* | 4/2019 | Inoue | B81B 3/0072 |
| 2019/0323881 | A1 | 10/2019 | Mögelin et al. | |
| 2019/0335271 | A1* | 10/2019 | Post | H04R 1/38 |
| 2021/0204048 | A1* | 7/2021 | Chandrasekaran | H04R 1/04 |
| 2021/0274287 | A1* | 9/2021 | Naderyan | H04R 7/26 |
| 2021/0337317 | A1* | 10/2021 | Loeppert | H04R 19/04 |
| 2025/0159402 | A1* | 5/2025 | Mogelin | H04R 1/1041 |

OTHER PUBLICATIONS

Sorger Alexander et al. "Capacitive sensing electrodes with reduced squeeze-film damping" 2017 19th. International conference on solid-state sensors, actuators and microsystems (transducers), IEEE, Jun. 18, 2017, pp. 1033-1036.

International Search Report for International Application No. PCT/EP2022/066186 dated Sep. 8, 2022.

* cited by examiner

VIBRATION SENSOR WITH AIR VENTING CHANNELS

CROSS-REFERENCE TO RELATED APPLICATIONS

This application is a national phase under 35 U.S.C. § 371 of PCT International Application No. PCT/EP2022/066186 which has an International filing date of Jun. 14, 2022, which claims priority to Danish Application No. PA202170315, filed Jun. 21, 2021, the entire contents of each of which are hereby incorporated by reference.

FIELD OF THE INVENTION

The present invention relates to a vibration sensor comprising a carrier substrate comprising a first surface (e.g. a top surface) and a second surface (e.g. a bottom surface), a suspension member and a moveable mass secured thereto, wherein the moveable mass and/or at least part of the suspension member is/are adapted to vibrate when the vibration sensor is exposed to external vibrations, a read-out arrangement for detecting vibrations of the moveable mass and/or at least part of the suspension member, and a signal processor for at least processing an electric signal from the read-out arrangement, wherein the read-out arrangement comprises a capacitor formed by a first capacitor electrode and a second capacitor electrode separated by an air gap, wherein squeeze film damping effects between the first and second capacitor electrodes are reduced.

BACKGROUND OF THE INVENTION

Squeeze film damping effects in vibration sensors with narrow air gaps are known to be problematic as the viscous damping caused by the air in the narrow air gap generally becomes very high. As a consequence the usable bandwidth is reduced and the noise level of the vibration sensor is increased. An example of a prior art solution may be found in U.S. Pat. No. 4,574,327 which generally relates to a capacitive transducer comprising a piston-like moveable capacitor plate adapted to move within a cavity. In U.S. Pat. No. 4,574,327 a plurality of passages are provided into the piston-like moveable capacitor plate in order to allow passage of fluid therethrough in order to dampen unwanted plate movement. The surfaces of the moveable capacitor plate are moreover provided with special grooves to guide the flow of fluid toward and away from the passages thus controlling the fluid movement during movement of the piston-like movable capacitor plate within the cavity. Thus, in U.S. Pat. No. 4,574,327 a piston-like movable capacitor plate is adapted to move in a piston-like fashion within a cavity (toward and away from a fixed plate) and thus provide a movement of a large area in that the entire area of the movable capacitor plate moves toward and away from the fixed plate rather than in a flexing type pattern of movement usually provided with capacitive transducers.

It may be seen as an object of the embodiments of the present invention to reduce squeeze film damping and thus enabling capacitive sensing in relation to narrow air gaps in vibration sensors.

It may be seen as a further object of the embodiments of the present invention to provide a low-noise vibration sensor that can be reflowed during manufacturing.

DESCRIPTION OF THE INVENTION

The above-mentioned objects are complied with by providing, in a first aspect, a vibration sensor comprising a) a carrier substrate comprising a first surface and a second surface, b) a suspension member and a moveable mass secured thereto, wherein the moveable mass and/or at least part of the suspension member is/are adapted to vibrate when the vibration sensor is exposed to external vibrations, c) a read-out arrangement for detecting vibrations of the moveable mass and/or at least part of the suspension member, and d) a signal processor for at least processing an electric signal from the read-out arrangement, wherein the read-out arrangement comprises a capacitor formed by a first capacitor electrode and a second capacitor electrode separated by an air gap, and wherein the first capacitor electrode and/or the second capacitor electrode comprise(s) one or more air venting channels in order to reduce squeeze film damping effects between the first and second capacitor electrodes.

Thus, according to the present invention one or more air venting channels are provided in the first and/or second capacitor electrodes in order to balance or stabilise the air pressure in the air gap. Thus, the functioning of the one or more air venting channels is twofold in that the one or more air venting channels should prevent that air becomes pressurised in the air gap when the air gap is decreased, and that air can be guided to the air gap when the air gap is increased. This is advantageous in that squeeze film damping effects between the first and second capacitor electrodes are then significantly reduced. In the present context the term squeeze film damping is to be understood as viscous damping caused by air trapped in the air gap between the first and second capacitor electrodes. In the vibration sensor of the present invention the air gap is typically in the range of 5-15 μm.

The vibration sensor of the present invention is advantageous in that it provides a low noise level and a high sensitivity. The low noise level and the high sensitivity is provided by the incorporation of a relatively large moveable mass (>1 mg) and a relatively thin air gap (5-15 μm) between the first capacitor electrode and the second capacitor electrode. Moreover, the vibration sensor of the present invention is advantageous since it is reflowable.

The read-out arrangement of the vibration sensor of the present invention is adapted to detect external vibrations via changes of the capacitance of the capacitor formed by the first and second capacitor electrodes. These capacitance changes are caused by displacements of the first and/or second capacitor electrodes which changes the air gap and thus the distance between the first and second capacitor electrodes. As one of the capacitor electrodes is electrically biased with a substantially constant charge, the capacitance change will change the voltage between the first and second capacitor electrodes. This voltage change is a measure for a detected external vibration due to the acceleration of the sensor. The detected voltage change is processed by the signal processor that may be operating in the analog or digital domain applying any digital coding scheme.

The vibration sensor of the present invention is preferably suitable for being incorporated into hearing devices, such as a hearing device, hearing aid, in-ear device, portable audio device, hearable, headset, earphone, earbud or a similar device. The role of the vibration sensor may be numerous, such as detecting voice induced vibrations via bone conduction in the skull. Detection of such voice induced vibrations in the skull is preferably used in relation to voice recognition where the user's own voice is separated or recognised in an otherwise acoustically noisy environment.

In one embodiment at least part of the suspension member of the vibration sensor is electrically conducting. Preferably, at least the electrically conducting part of the suspension member forms the first capacitor electrode. The second capacitor electrode is preferably provided on the first surface of the carrier substrate. Thus, the air gap is formed between the electrically conducting suspension member forming the first capacitor electrode and the second capacitor electrode preferably provided on the first surface of carrier substrate.

The second capacitor electrode preferably comprises one or more air venting channels. Preferably, the one or more air venting channels of the second capacitor electrode extend into at least part of the carrier substrate. Extending the one or more air venting channels into at least part of the carrier substrate is advantageous in that this increases the dimensions of the cross section of one or more air venting channels and thus decreases the acoustic resistance of the one or more air venting channels. Thus, by extending the one or more air venting channels into at least part of the carrier substrate, the ability of the one or more air venting channels to lead air away from the air gap, and thus reduce squeeze film damping effects, is significantly increased.

Preferably, the first capacitor electrode is electrically connected to ground, and the second capacitor electrode is electrically biased by the signal processor. Thus, the signal processor is, in addition to processing an electric signal from the read-out arrangement, adapted to provide a substantially constant charge to the second capacitor electrode. The fact that both electrode biasing and signal processing are combined in a single integrated circuit is advantageous in that it saves space. Preferably, only one capacitor electrode requires an electrical connection to the signal processor. The other capacitor electrode is preferably grounded via the housing of the vibration sensor.

The one or more air venting channels preferably form a three-dimensional pattern in the first capacitor electrode and/or in the second capacitor electrode. As already addressed, the one or more air venting channels are preferably adapted to lead air to and/or from the air gap between the first and second capacitor electrodes. Thus, the one or more air venting channels should preferably prevent that air becomes pressurised in the air gap when the air gap is decreased and ensure that air can be guided to the air gap when the air gap is increased.

The one or more air venting channels in the first capacitor electrode and/or in the second capacitor electrode may extend through the entire thickness of the first capacitor electrode and/or the second capacitor electrode. Alternatively, or in combination therewith, the one or more air venting channels may extend only partially through the entire thickness of the first capacitor electrode and/or the second capacitor electrode thus forming one or more recesses or indentations in the first capacitor electrode and/or the second capacitor electrode.

In addition to forming a three-dimensional pattern in the first capacitor electrode and/or in the second capacitor electrode the one or more air venting channels may, as already mentioned, also extend into the carrier substrate. The three-dimensional pattern formed by the one or more air venting channels may in principle involve any three-dimensional pattern as long as it leads air away from the air gap.

In order to provide a compact vibration sensor, the moveable mass and the signal processor are preferably arranged on opposite sides of the carrier substrate. In the present context the term opposite means that the moveable mass is arranged on one side of the carrier substrate, whereas the signal processor is arranged on another side of the carrier substrate. With this arrangement the carrier substrate becomes arranged between the moveable mass and the signal processor. Thus, the moveable mass, the carrier substrate and the signal processor are preferably arranged in stacked arrangement in order to save space.

The carrier substrate preferably comprises a first printed circuit board (PCB) comprising first and second opposing surfaces. Using a first PCB as the carrier substrate is advantageous in that the second capacitor electrode may then be easily implemented on the first surface of the first PCB, whereas the opposing, second surface of the first PCB may preferably be used for electrically connected electronic devices to the first PCB. In this respect the signal processor is preferably secured to the second surface of the first PCB. The first PCB preferably comprises one or more vias for electrically connecting the opposing first and second surfaces of the first PCB, such as electrically connecting the second capacitor electrode to the signal processor via said one or more vias as it will be discussed in further details below.

Preferably, the vibration sensor further comprises a spacer, secured to the second surface of the first PCB. The spacer preferably comprises one or more vias electrically connected to the second surface of the first PCB. Preferably, the vibration sensor further comprises a second PCB comprising first and second opposing surfaces, wherein the one or more vias of the spacer are electrically connected to the first surface of the second PCB, and wherein one or more contact pads are provided on the second surface of the second PCB for connecting the vibration sensor to external electronic devices. In the present context external electronic devices may include power supplies, additional signal processors, such as amplifiers, filters etc.

As it will be discussed in further details below, the air gap between the first and second capacitor electrodes may, at least partly, be provided by a spacer arranged between at least part of the first and second capacitor electrodes. Thus, the distance between the first and second capacitor electrodes may, at least partly, be given by a spacer, more particularly the height or thickness of a spacer. Alternatively, or in combination therewith, the air gap between the first and second capacitor electrodes may, at least partly, be provided by one or more embossed elements of the suspension member.

In relation to the dimensioning of the one or more air venting channels the acoustic resistance of any one of the one or more air venting channels of the first capacitor electrode and/or the second capacitor electrode is/are preferably lower than the acoustic resistance of any part of the air gap between the first and second capacitor electrodes. The low acoustic resistance of the one or more air venting channels is advantageous in that it secures that air can be led to and/or from the air gap between the first and second capacitor electrodes so that squeeze film damping effects are significantly reduced.

In general, the acoustic resistance of an air venting channel is mainly determined by the smallest cross-sectional dimension of the air venting channel. If the smallest cross-sectional dimension is larger than the cross-sectional dimension of the air gap then the acoustic resistance of the air venting channel is lower than the acoustic resistance air film in the gap. In case the vibration sensor comprises a plurality of air venting channels, these air venting channels divide the squeeze film resistance in multiple sections and effectively puts the resistances of these section in parallel.

In a second aspect, the present invention relates to a hearing device comprising a vibration sensor according to the first aspect, wherein the hearing device comprises a hearing aid, a hearable, a headset, an earbud or a similar device.

In a third aspect, the present invention relates to a use of a vibration sensor according to the first aspect, wherein the vibration sensor is used for detecting voice induced vibrations in the skull of the user of the hearing device, and wherein the detected voice induced vibrations are used for voice recognition of the user's own voice.

In general, the various aspects of the present invention may be combined and coupled in any way possible within the scope of the invention. These and other aspects, features and/or advantages of the present invention will be apparent from and elucidated with reference to the embodiments described hereinafter.

BRIEF DESCRIPTION OF THE DRAWINGS

The present invention will now be described with reference to the accompanying drawings where.

DETAILED DESCRIPTION OF THE INVENTION

In general, the present invention relates to a vibration sensor for a hearing device. The vibration sensor comprises, among other features, a suspension member and a moveable mass adapted to vibrate when the vibration sensor is exposed to external vibrations. The vibration sensor further comprises a capacitive read-out arrangement for detecting vibrations of the moveable mass and/or at least part of the suspension member. The capacitive read-out arrangement comprises first and second capacitor electrodes, wherein one or more air venting channels is/are provided in the first and/or second capacitor electrode in order to reduce squeeze film damping effects.

Figure 1:
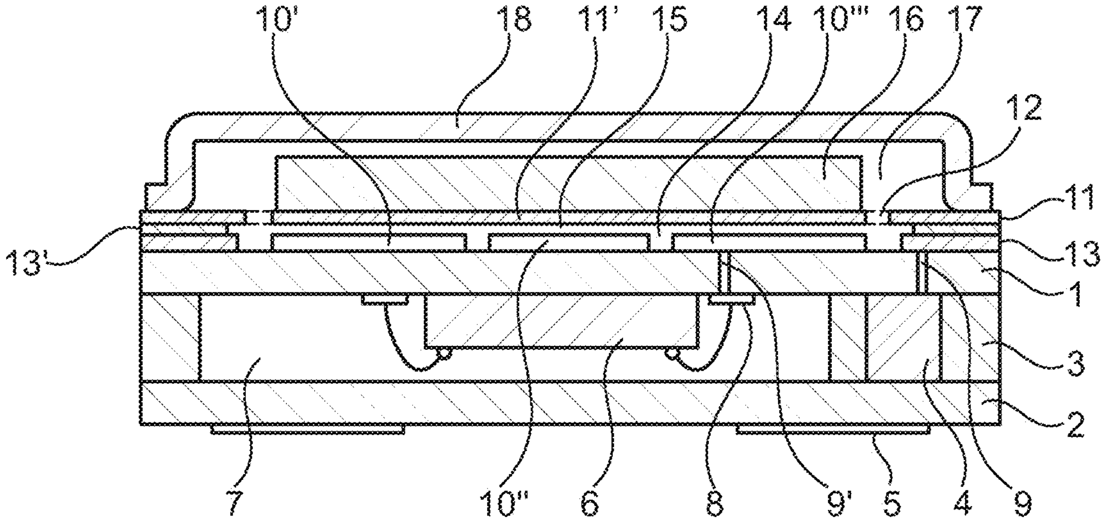
FIG. 1 shows a cross-sectional view of an embodiment of the present invention.

Referring now to FIG. 1, a cross-sectional view of an embodiment of the vibration sensor is depicted. Generally, the vibration sensor relies on a capacitive detection scheme where the distance between a first capacitor electrode 11 and a second capacitor electrode 10 (see FIG. 2) comprising second capacitor electrode portions 10', 10'', 10''', and thus the capacitance, is adapted to change when the vibration sensor is exposed to external vibrations. In the embodiment shown in FIG. 1 the first capacitor electrode 11 is electrically connected to ground, whereas the second capacitor electrode portions 10', 10'', 10''' are electrically biased by the signal processor 6. The signal processor 6 is moreover adapted to process voltage changes caused by capacitance changes between the first capacitor electrode 11 and the second capacitor electrode portions 10', 10'', 10'''. The signal processor 6 is electrically connected to the second capacitor electrode portions 10', 10'', 10'' through wire bonding 8 and via 9' in the first PCB 1.

Around or on the outside of the second capacitor electrode portions 10', 10'', 10'' a rim 13 forming a periphery is provided. Preferably, the rim 13 forms part of the same layer as second capacitor electrode portions 10', 10'', 10'' so that the second capacitor electrode portions 10', 10'', 10''' and the rim 13 has exactly the same thickness. A spacer 13' is arranged on top of the rim 13. Preferably, both the rim 13 and the spacer 13' are electrically conductive. Moreover, the rim 13 and the spacer 13' are preferably electrically connected to ground through via 9 in the first PCB 1 and through via 4 in the spacer 3 between the first PCB 1 and the second PCB 2.

As seen in FIG. 1, the first capacitor electrode 11 and the second capacitor electrode portions 10', 10'', 10'' are separated by an air gap 15 defined by the spacer 13'. As already mentioned, the size this air gap 15, i.e. the distance between the first capacitor electrode 11 and the second capacitor electrode portions 10', 10'', 10''', is adapted to change when the vibration sensor is exposed to external vibrations as the first capacitor electrode 11 also acts as a suspension member for the moveable mass 16 secured thereto. The air gap is typically in the range of 5-15 μm when no acceleration is applied. The resilient properties of the combined suspension member/first capacitor electrode 11 (in the following referred to as the first capacitor electrode 11) is provided by an elastic member 12 either secured to, or forming part of, the first capacitor electrode 11. A housing 18 defining a cavity 17 is provided over the moveable mass 16 and the first capacitor electrode 11.

As also depicted in FIG. 1, the vibration sensor further comprises a first PCB 1 and a second PCB 2. The second PCB 2 comprises first and second opposing surfaces, wherein one or more contact pads 5 are provided on the second surface of the second PCB 2. The one or more contact pads 5 facilitate easy connection of the vibration sensor to external electronic devices. Moreover, the spacer 3 is provided between the first PCB 1 and the second PCB 2 so that a cavity 7 is formed by the first PCB 1 and second PCB 2 and the spacer 3. The spacer 3 comprises one or more vias 4 for electrically interconnecting the first PCB 1 and the second PCB 2.

In relation to the capacitive detection scheme, the electrically active part of the first capacitor electrode 11 is the centre electrode portion 11' secured to the moveable mass 16. Similarly, the electrically active part of the second capacitor electrode 10 are the three centre electrode portions 10', 10'', 10''' which are separated by air venting channels 14 in order to reduce squeeze film damping effects between the first capacitor electrode portion 11' and the second capacitor electrode portions 10', 10'', 10'''. Thus, when the distance between the electrically active parts of the first capacitor electrode 11' and the second capacitor electrode portions 10', 10'', 10''' is reduced air is allowed to escape via the air venting channels 14 whereby squeeze film damping effects are reduced. As seen in FIG. 1 the air venting channel 14 in the second capacitor electrode 10 extends through the entire thickness of the second capacitor electrode 10.

In order to detect voice induced vibration signals via bone conduction, the bandwidth of the vibration sensor is typically larger than 6 kHz. In addition to this, the resonance frequency of the vibration sensor is typically close to the upper limit of bandwidth, e.g. above 4 kHz, and the resonance peak is typically less than 10 dB higher compared to the sensitivity at 1 KHz. With this approach Q will typically be smaller than 3. Moreover, the noise floor of the vibration sensor should be low, i.e. <−98 dB re. 1 g in ⅓$^{rd}$ octave band at the resonance frequency. In order to meet these requirements the mass of the moveable mass 16 needs to be relatively high, such as higher than 1 mg. As the moveable mass 16 typically has a thickness in the range of 100-200 μm, the surface areas of the moveable mass 16 can be up to 2.5 mm$^2$. In terms of manufacturing the moveable mass may be made of a variety of materials including steel, tantalum or tungsten.

Figure 2:
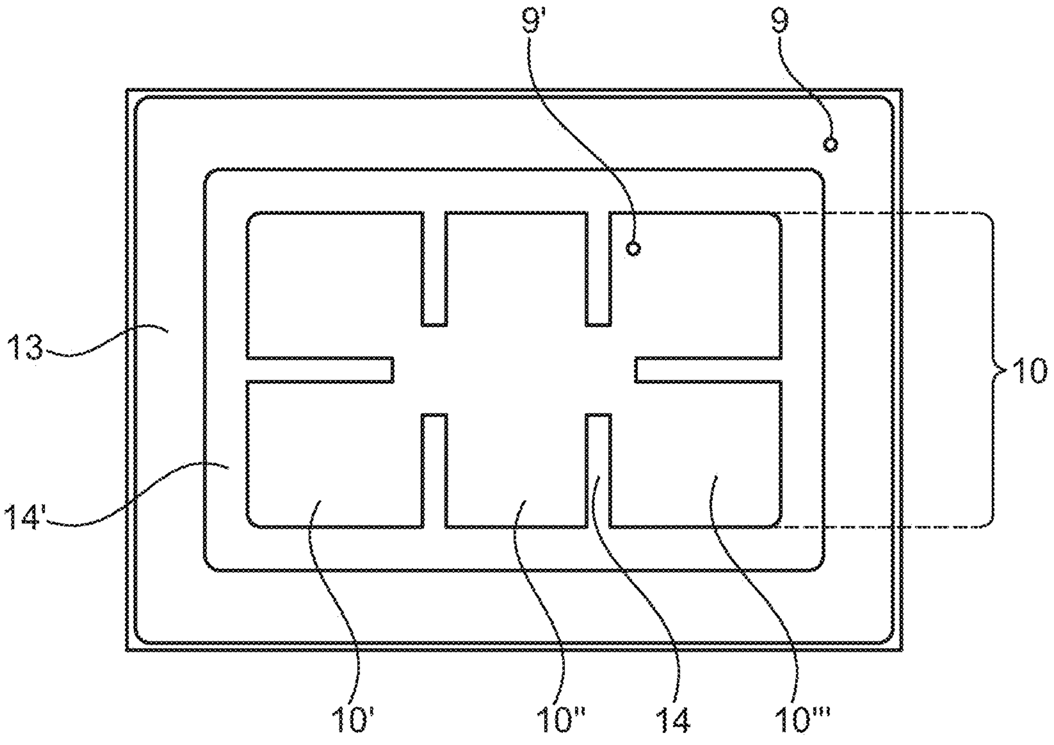
FIG. 2 shows a top view of a carrier substrate of the embodiment shown in FIG. 1.

Turning now to FIG. 2, a top view of the second capacitor electrode 10 comprising electrode portions 10', 10" and 10'" is depicted. As seen in FIG. 2 the second capacitor electrode portions 10', 10" and 10'" are electrically connected and thus form one half of the second capacitor electrode 10. Also the surrounding rim 13 is depicted in FIG. 2. As seen in FIG. 2 the second capacitor electrode 10 comprises a total of six centre electrode portions and a total of six laterally arranged air venting channels 14 which extend through the entire thickness of the second capacitor electrode 10.

A surrounding air venting channel 14', which is fluidly connected to the air venting channels 14, surrounds the six centre electrode portions. The two vias 9, 9' arranged through the first PCB 1, cf. FIG. 1, are also depicted in FIG. 2. It should be noted that the number of electrode portions may differ from the six portions shown in FIG. 2. Similarly, the number of air venting channels 14 may differ from the six channels shown in FIG. 2. Moreover, both the electrode portions and the air venting channels may be arranged differently compared to the patterns shown in FIG. 2.

Figure 3:
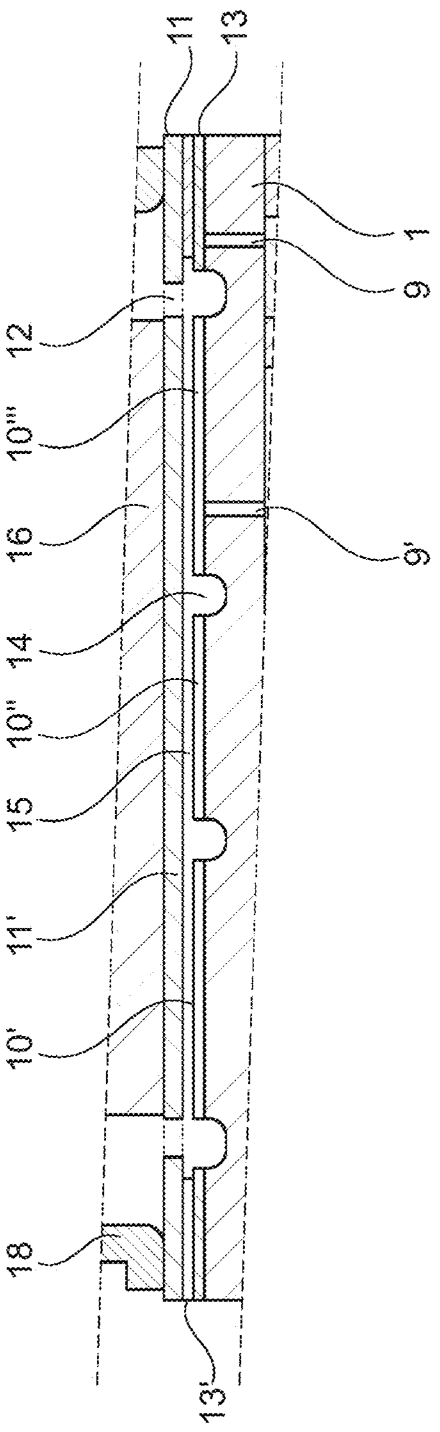
FIG. 3 shows a cross-sectional view of an embodiment where the air venting channels extend into the carrier substrate.

Referring now to FIG. 3, an enlarged cross-sectional view of another embodiment of the vibration sensor is depicted. Similar to the embodiment shown in FIG. 1, the second capacitor electrode 10 (see FIG. 2) including its centre electrode portions 10', 10", 10" are arranged on the first PCB 1 having vias 9, 9' provided therein. The spacer 13' is arranged between the rim 13 and the first capacitor electrode 11 so that an air gap 15 is provided therebetween. The resilient properties of the first capacitor electrode 11 is provided by the elastic member 12 which is either secured to, or forms part of, the first capacitor electrode 11. A part of the housing 18 is also depicted in FIG. 3.

Still referring to FIG. 3, the electrically active part of the first capacitor electrode 11 is the centre electrode portion 11' to which the moveable mass 16 is secured. Similarly, the electrically active parts of the second capacitor electrode 10 (see FIG. 2) are the three centre electrode portions 10', 10", 10'" which are separated by air venting channels 14 in order to reduce squeeze film damping effects between the first capacitor electrode portion 11' and the second capacitor centre electrode portions 10', 10", 10'". Air venting channels 14 are also provided between the electrode portions 10', 10'" and the rim 13. The air venting channels 14 extend through the entire thickness of the second capacitor electrode 10. In order to further reduce squeeze film damping effects between the first capacitor electrode portion 11' and the second capacitor centre electrode portions 10', 10", 10'" the one or more air venting channels 14 are extended into the first PCB 1 thereby the acoustic resistance of the one or more air venting channels 14 are reduced. As a consequence larger amounts of air can escape through the one or more air venting channels 14.

In the embodiment shown in FIG. 3 the first capacitor electrode 11 is electrically connected to ground, whereas the second capacitor electrode 10, including the three centre electrode portions 10', 10", 10'", are electrically biased by the signal processor (not shown), which is also adapted to process voltage changes caused by capacitance changes between the first capacitor electrode portion 11' and the second capacitor electrode portions 10', 10", 10'".

Figure 4:
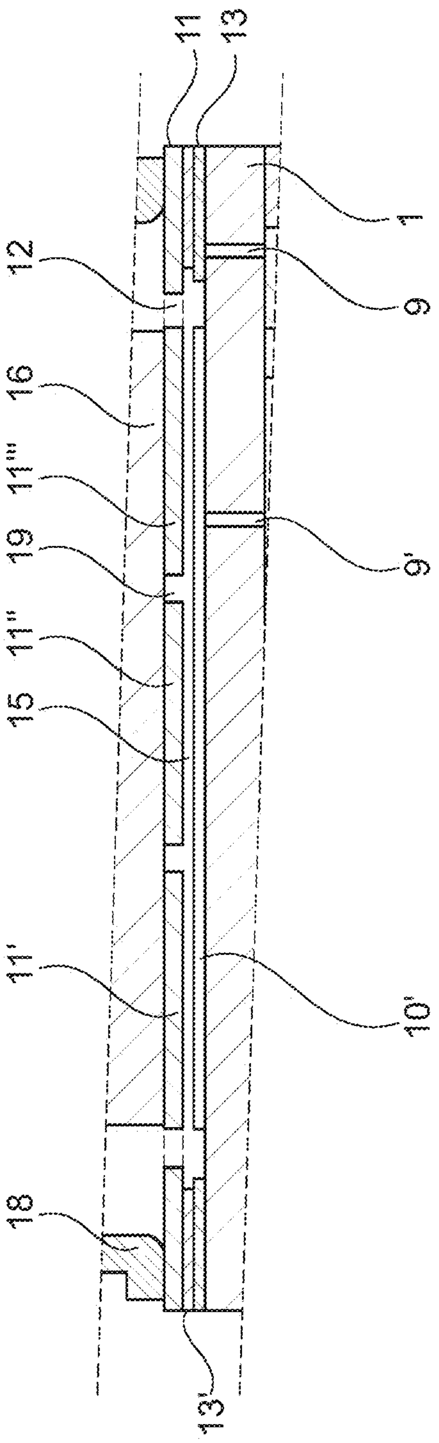
FIG. 4 shows a cross-sectional view of an embodiment where the air venting channels are provided in a movable capacitor electrode.

Turning now to the embodiment depicted in FIG. 4, the one or more air venting channels 19 are now provided in the first capacitor electrode 11—more particularly between the first capacitor electrode portions 11', 11", 11'". The one or more air venting channels 19 extend through the entire thickness of the first capacitor electrode 11. As seen in FIG. 4 no air venting channels are provided in the second capacitor electrode portion 10' which is arranged on the first PCB 1 having vias 9, 9' provided therein. The spacer 13' is arranged between the rim 13 and the first capacitor electrode 11 so that an air gap 15 is provided therebetween. The resilient properties of the first capacitor electrode 11 is provided by the elastic member 12 which is either secured to, or forms part of, the first capacitor electrode 11. A part of the housing 18 is also depicted in FIG. 4. The first capacitor electrode portions 11', 11", 11" are electrically connected to ground, whereas the second capacitor electrode 10, including the centre electrode portions 10', is electrically biased by the signal processor (not shown), which is also adapted to process voltage changes caused by capacitance changes between the first capacitor electrode portions 11', 11", 11" and the second capacitor electrode portion 10'.

Figure 5:
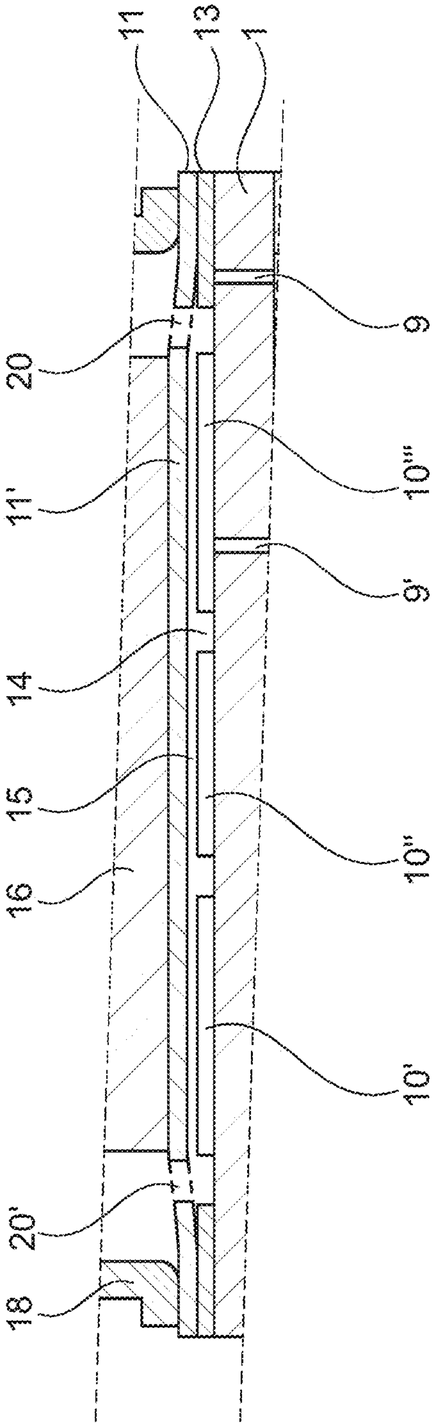
FIG. 5 shows a cross-sectional view of an embodiment comprising a thin spacer and an embossed suspension member.

Referring now to the embodiment shown in FIG. 5, the air gap 15 between the first capacitor electrode portion 11' and the second capacitor centre electrode portions 10', 10", 10'" is provided by the embossed or bent elastic elements 20, 20' of the first capacitor electrode 11. The embossed or bent elastic elements 20, 20' may be either secured to, or form part of, the first capacitor electrode 11. A part of the housing 18 is also depicted in FIG. 5. The electrically active part of the first capacitor electrode 11 is the centre electrode portion 11' to which the moveable mass 16 is secured. Similarly, the electrically active part of the second capacitor electrode 10 (see FIG. 2) are the three centre electrode portions 10', 10", 10'" which are separated by air venting channels 14 in order to reduce squeeze film damping effects between the first capacitor electrode portion 11' and the second capacitor centre electrode portions 10', 10", 10'". The air venting channels 14 extend through the entire thickness of the second capacitor electrode 10. On the outside of the second capacitor centre electrode portions 10', 10", 10'" the rim 13 is provided. Similar to the previous embodiments the first capacitor electrode 11 is electrically connected to ground, whereas the second capacitor electrode 10, including the three centre electrode portions 10', 10", 10'", are electrically biased by the signal processor (not shown) which is also adapted to process voltage changes caused by capacitance changes between the first capacitor electrode portion 11' and the second capacitor centre electrode portions 10', 10", 10'".

In the embodiments depicted in FIGS. 1-5 the one or more air venting channels extend through the entire thickness of the first capacitor electrode and/or the second capacitor electrode. It should though be noted that the one or more air venting channels may, as an alternative or in combination therewith, extend only partially through the entire thickness of the first capacitor electrode and/or the second capacitor electrode thus forming one or more recesses or indentations in the first capacitor electrode and/or the second capacitor electrode. Also, the respective air venting channels may have one or more portions that extend through the entire thickness of the first capacitor electrode and/or the second capacitor electrode, and one or more other portions that extend only partially through the entire thickness of the first capacitor electrode and/or the second capacitor electrode.

Although the present invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims, without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A vibration sensor, comprising:

a) a carrier substrate comprising a first surface and a second surface, b) a suspension member and a moveable mass secured thereto, wherein the moveable mass and/or at least part of the suspension member is/are adapted to vibrate when the vibration sensor is exposed to external vibrations, c) a read-out arrangement for detecting vibrations of the moveable mass and/or at least part of the suspension member, and d) a signal processor for at least processing an electric signal from the read-out arrangement, wherein, the suspension member and the moveable mass secured thereto are moveable in relation to the carrier substrate in a vertical direction that extends perpendicular to the first surface of the carrier substrate, the read-out arrangement comprises a capacitor formed by a first capacitor electrode and a second capacitor electrode separated by an air gap, the second capacitor electrode is on the first surface of the carrier substrate such that the second capacitor electrode is between the carrier substrate and the first capacitor electrode in the vertical direction, the second capacitor electrode is immovable in relation to the carrier substrate in the vertical direction, and the first capacitor electrode is movable in relation to the carrier substrate and the second capacitor electrode in the vertical direction, and the first capacitor electrode and/or the second capacitor electrode comprise(s) one or more air venting channels in order to reduce squeeze film damping effects between the first capacitor electrode and the second capacitor electrode.

2. The vibration sensor according to claim 1, wherein at least part of the suspension member is an electrically conducting part that is electrically conducting, and in that at least the electrically conducting part of the suspension member forms the first capacitor electrode.

3. The vibration sensor according to claim 1, wherein the second capacitor electrode comprises one or more air venting channels, and in that the one or more air venting channels of the second capacitor electrode extend into at least part of the carrier substrate.

4. The vibration sensor according to claim 1, wherein the first capacitor electrode is electrically connected to ground, and in that the second capacitor electrode is electrically biased by the signal processor.

5. The vibration sensor according to claim 1, wherein the one or more air venting channels form a three-dimensional pattern in the first capacitor electrode and/or in the second capacitor electrode.

6. The vibration sensor according to claim 5, wherein the one or more air venting channels are adapted to lead air to and/or from the air gap between the first capacitor electrode and the second capacitor electrode.

7. The vibration sensor according to claim 1, wherein the moveable mass and the signal processor are arranged on opposite sides of the carrier substrate such that at least a portion of the carrier substrate is between the moveable mass and the signal processor.

8. The vibration sensor according to claim 1, wherein the carrier substrate comprises a first PCB comprising first and second opposing surfaces, the first surface of the first PCB defining the first surface of the carrier substrate such that the second capacitor electrode is on the first surface of the first PCB.

9. The vibration sensor according to claim 8, wherein the signal processor is secured to the second surface of the first PCB such that the first PCB is between the moveable mass and the signal processor.

10. The vibration sensor according to claim 8, wherein the vibration sensor further comprises a spacer secured to the second surface of the first PCB, and the spacer comprises one or more vias electrically connected to the second surface of the first PCB.

11. The vibration sensor according to claim 10, wherein the vibration sensor further comprises a second PCB comprising first and second opposing surfaces, and in that the one or more vias of the spacer are electrically connected to the first surface of the second PCB, and in that one or more contact pads are provided on the second surface of the second PCB for connecting the vibration sensor to external electronic devices.

12. The vibration sensor according to claim 1, wherein the air gap between the first capacitor electrode and the second capacitor electrode is at least partly provided by a spacer arranged between at least part of the first capacitor electrode and the second capacitor electrode.

13. The vibration sensor according to claim 1, wherein the air gap between the first capacitor electrode and the second capacitor electrode is at least partly provided by one or more embossed elements of the suspension member.

14. The vibration sensor according to claim 1, wherein an acoustic resistance of any one of the one or more air venting channels of the first capacitor electrode and/or the second capacitor electrode is/are lower than an acoustic resistance of any part of the air gap between the first capacitor electrode and the second capacitor electrode.

15. A hearing device, comprising:

the vibration sensor according to claim 1, and one of a hearing aid, a hearable, a headset, or an earbud.

16. The hearing device according to claim 15, wherein:

the vibration sensor is configured to detect voice induced vibrations in a skull of a user of the hearing device, and the hearing device is configured to perform voice recognition of a voice of the user based on the detected voice induced vibrations.

* * * * *